United States Patent [19]

Ledin

[11] Patent Number: 4,512,507

[45] Date of Patent: Apr. 23, 1985

[54] DEVICE FOR JOINING ELECTRONIC TRANSMISSION WIRE TO ELECTRONIC CONNECTORS

[76] Inventor: Walter L. Ledin, 4904 Arbor Rd., Long Beach, Calif. 90808

[21] Appl. No.: 414,295

[22] Filed: Sep. 2, 1982

[51] Int. Cl.[3] .................................... B23K 3/00

[52] U.S. Cl. .................................... 228/57; 228/46

[58] Field of Search .................... 228/46, 57; 29/760, 29/748; 269/289 R, 903

[56] References Cited

U.S. PATENT DOCUMENTS 2,660,004 11/1953 Daley .............................. 269/903 X 3,552,630 1/1971 Dean .............................. 228/57 X 3,621,194 11/1971 Vermillion .................... 228/57 X

*Primary Examiner*—Kenneth J. Ramsey

*Attorney, Agent, or Firm*—Howard A. Kenyon

[57] ABSTRACT

A device for joining electronic transmission wire to electronic connectors is described that is designed to assist in joining wire to both male and female connectors. Holes are fitted in the device to accept the male connectors and pins are fitting on the device to accept the female connectors. Since most electronic connectors are small in size and require precision work, this device allows the operator using either a soldering, brazing or welding method to use both hands and concentrate on the intricate details of joining wire to the small electronic connectors.

3 Claims, 7 Drawing Figures

DEVICE FOR JOINING ELECTRONIC TRANSMISSION WIRE TO ELECTRONIC CONNECTORS

BACKGROUND OF THE INVENTION

1. Field of the Invention

This invention relates to a device for joining electronic transmission wire to electronic connectors.

2. Description of the Prior Art

There are devices in the public domain such as jigs or fixtures to assist joining electrical wire. These devices act as a "third hand" when an operator is joining electrical wire. One such device is sold by Radio Shack, a Tandy Corporation, catalog number 64-2093 and is called "Helping Hands". This device is essentially a pair of spring biased clips that are on the end of flexible arms which are connected to a weighted base whereby two work pieces may be held in contact with each other in preparation for joining. These clips, however, are small and are sufficient to hold most gauges of wire required for electronic operation. These clips, however, are too small to hold an electronic connector and therefore cannot be used in lieu of the device described in the present invention. In addition, the "Helping Hands" cannot hold two electronic connectors (male and female) simultaneously, as in the present invention, when joining electronic wire to the connectors.

SUMMARY OF THE INVENTION

It is therefore an object of the present invention to provide a device for joining a electronic transmission wire to a electronic connector.

It is another object of the present invention to provide a "third hand" to assist the operator when joining electronic transmission wire to a electronic connector.

It is still another object of the present invention to provide a heat sink when joining electronic transmission wire to a electronic connector.

It is yet another object to provide a device that is easy to manufacture and low in cost for joining a electronic transmission wire to a electronic connector.

Briefly, in accordance with the invention, there is provided a device for joining a electronic transmission wire to a electronic connector that can be used either in a vise or laying flat on a surface. The embodiments are designed to accept a male connector or a female connector by placing the connector to be joined either on the pins or in the holes of the device. The pins and holes are sized to accept a specific size connector. A separate tool is developed to join different size connector pins while also considering the number and the placement of the pins.

The novel features are believed to be characteristics of the invention and its method of operation, together with further objects and advantages thereof, will be better understood from the following description in connection with the accompanying drawings in which a presently preferred embodiment of the invention is illustrated by way of examples. It is to be expressly understood, however, that the drawings are for purposes of illustration and description only and are not intended as a definition of the limits of the invention.

While the invention will be described in connection with the preferred embodiment, it will be understood that it is not intended to limit the invention to that embodiment. On the contrary, it is intended to cover all alternatives, modifications, and equivalents that may be included within the spirit and scope of the invention as defined by the appended claims.

DETAILED DESCRIPTION OF THE INVENTION

Figure 1:
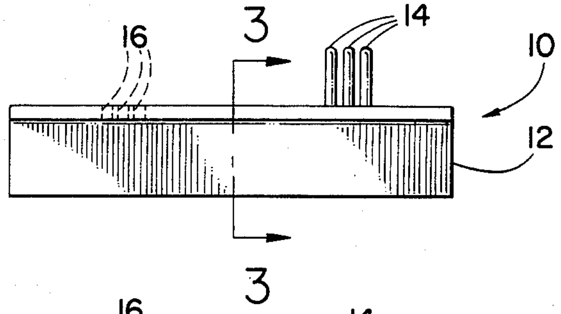
FIG. 1 is a side view of the joining device developed for clamping in a vise.
Figure 2:
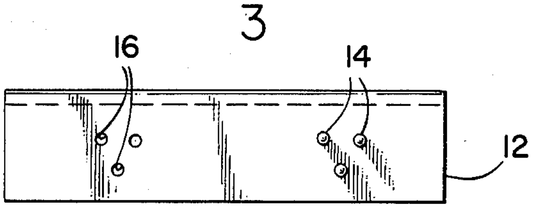
FIG. 2 is a top view of the joining device developed for clamping in a vise.
Figure 3:
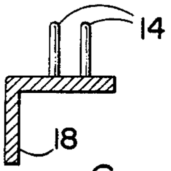
FIG. 3 is a cross section of the joining device showing the angle configuration.
Figure 4:
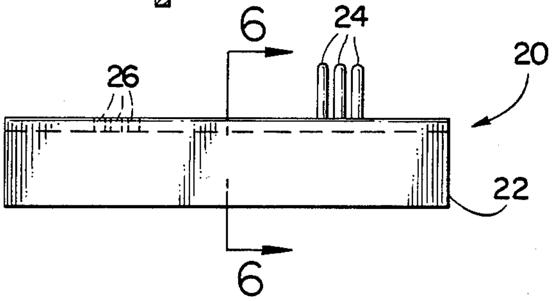
FIG. 4 is a side view of the joining device developed for laying on a surface.
Figure 5:
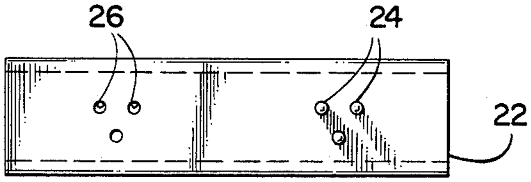
FIG. 5 is a top view of the joining devise developed for laying on a surface.
Figure 6:
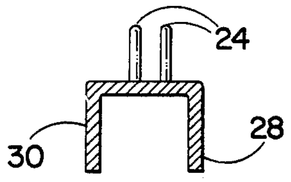
FIG. 6 is a cross section of the joining device showing the channel configuration.
Figure 7:
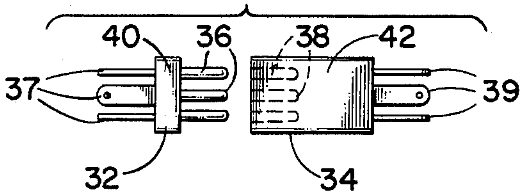
FIG. 7 is a side view of a typical electrical connector combination.

Referring to FIG. 1 there is shown a device for joining electronic transmission wire to electronic connectors generally indicated at 10. The joining device 10 is comprised of frame 12, pins 14 and holes 16. FIG. 2 presents a top view of joining device 10 with frame 12, pins 14 and holes 16. As seen in FIG. 3, embodiment 10 is in the shape of a 90° angle whereby leg 18 of frame 12 may be clamped in the jaws of a vise (not shown). Another embodiment for joining electronic transmission wire to electronic connectors, generally indicated by 20, does not require a clamping means to secure the device but can be placed on any flat surface. The joining device 20 is comprised of frame 22, pins 24 and holes 26. FIG. 5 presents a top view of joining device 20 with frame 22, pins 24 and holes 26. As seen in FIG. 6, embodiment 20 is the shape of a channel whereby legs 28 and 30 of frame 22 may be placed on any flat surface. FIG. 7 shows a typical connector with the male half 32 and the female half 34 that may be used with joining device 10 or 20. As can be seen, pins 36 will fit into holes 16 or 26 to allow both hands of an operator to be free during joining of electronic transmission wire (not shown) to tang 37. Also, as noted, sockets 38 will fit onto pins 14 or 24 to allow both hands of an operator to be free during the joining of electronic transmission wire (not shown) to tang 39. The male connector 32 is encased in insulation material 40 and the female connector 34 is encased in insulation material 42. FIG. 7 shows a connector with 3 pins and 3 sockets which is the preferred embodiment, however, a connector with a plurality of pins and a corresponding plurality of sockets may have electronic transmission wire joined to the connecting tangs 37 and 39. A separate device for joining electronic transmission wire to electronic connectors must be developed for each diameter pin and socket and each length pin. It has been found that the majority of electronic transmission cable connectors as shown in FIG. 7 have connecting pins 36 that vary from 1/64 inch to $\frac{1}{4}$ inch in diameter. It has also been found that the majority of electronic transmission cable connectors also as shown in FIG. 7 have connecting pins 36 that vary from $\frac{1}{4}$ inch in length to 1 inch in length. It has further been found that the joining device as described by 10 and 20 herein makes an excellent heat sink to avoid overheating of the metal connector parts which may damage the insulation material shown by 40 and 42 in FIG. 7.

The preferred embodiment as previously stated is a electronic transmission wire connector having 3 pins as shown in FIG. 7. The most simple example of a 3 pin connector is a electronic transmission audio cable which contains a positive (+) wire, a negative (−) wire and a neutral wire or ground. This preferred embodiment also has a pin 36 that is 7/64 inches in diameter and ½ inch in length. The socket 38 of the preferred embodiment is slightly longer than the pin to allow the connector parts 32 and 34 to completely close. In addition, socket 38 is slightly smaller than pin 36 to allow a close fit which will provide electrical continuity. Describing the operation using the preferred embodiment as shown in FIG. 7, the connector pins 36 of connector 32 are fitted into holes 16 or 26 depending on whether a vise is available to hold the fixture 12 or the fixture 22 must lay on a flat surface. This allows the tangs 37 to be upright and exposed to receive the soldering, brazing or welding operation to attach a wire for electronic transmission. Also, as shown in FIG. 7, the connector sockets 38 are placed on fixture pins 14 or 24 depending on whether a vise is available to hold the fixture 12 or the fixture 22 must lay on a flat surface. This also allows the tangs 39 to be upright and exposed to receive the soldering, brazing or welding operation to attach a wire for electronic transmission.

It will be readily apparent to those skilled in the art that various modifications and changes can be made without departing from the spirit of the invention.

What is claimed is:

1. A device for simultaneously joining electrical wire to a male connector on one end and to a female connector on the other end of a electronic transmission cable comprising:

a fixture having a (sheet) metal plate (base) with a plurality of pins on one end adapted to accept said female connector and a plurality of apertures extending through said metal plate on the opposite end adapted to accept said male connector.

2. A device as described in claim 1 wherein said (sheet) metal plate (base) has at least one leg.

3. A device as described in claim 2 wherein said (sheet) metal plate (base) is made in one continuous section.

* * * * *